(12) United States Patent
Elliott et al.

(10) Patent No.: US 11,691,740 B2
(45) Date of Patent: Jul. 4, 2023

(54) WHEELCHAIR SECUREMENT SYSTEM AND ASSEMBLY

(71) Applicant: The Boeing Company, Chicago, IL (US)

(72) Inventors: Glen Elliott, Mill Creek, WA (US); Gentry Bingham Stephens, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 588 days.

(21) Appl. No.: 16/896,373

(22) Filed: Jun. 9, 2020

(65) Prior Publication Data
US 2021/0380258 A1 Dec. 9, 2021

(51) Int. Cl.
*B60P 7/08* (2006.01)
*B64D 11/06* (2006.01)
*A61G 3/08* (2006.01)

(52) U.S. Cl.
CPC ........ *B64D 11/0696* (2013.01); *A61G 3/0808* (2013.01); *B60P 7/0807* (2013.01); *B60P 7/0815* (2013.01); *B60P 7/0823* (2013.01); *A61G 2220/10* (2013.01)

(58) Field of Classification Search
CPC ..... B60P 7/0807; B60P 7/0815; B60P 7/0823; B60P 3/073; B60P 3/075; B60P 3/077; B60P 3/079; A61G 3/0808
USPC ..... 410/7–12, 21–23, 77, 80, 100, 104–105, 410/119, 121, 126, 130–139, 150
See application file for complete search history.

(56) References Cited

U.S. PATENT DOCUMENTS

| | | | |
|---|---|---|---|
| 7,425,110 B2* | 9/2008 | Ditch | A61G 3/0808 410/7 |
| 8,651,782 B2* | 2/2014 | Van Roosmalen | A61G 3/08 410/87 |
| 2009/0087278 A1* | 4/2009 | Girardin | A61G 3/0808 410/3 |
| 2014/0271020 A1 | 9/2014 | Girardin et al. | |
| 2020/0030166 A1 | 1/2020 | Bryant | |
| 2020/0031309 A1 | 1/2020 | Bryant | |

OTHER PUBLICATIONS https://www.northjersey.com/story/news/2020/02/21/all-wheels-up-nonprofit-works-air-travel-accessible-wheelchair-users/4819605002/—accessed on Jul. 1, 2020.
https://www.aviationbusinessnews.com/cabin/reinventing-the-wheelchair-making-air-travel-more-accessible-to-disabled-passengers/—accessed on Jul. 1, 2020.

* cited by examiner

*Primary Examiner* — Stephen T Gordon
(74) *Attorney, Agent, or Firm* — Quinn IP Law

(57) ABSTRACT

A wheelchair securement system includes a first anchoring mechanism and a second anchoring mechanism. The first anchoring mechanism includes a first bar, a first set of seat track anchors, and a first set of adjustable strap anchors. The first bar extends between the first set of seat track anchors and is secured thereto. The first set of adjustable strap anchors is secured to the first bar, and the first set of adjustable strap anchors is configured to be securable to a wheelchair. The second anchoring mechanism includes a second bar, a second set of seat track anchors, and a second set of adjustable strap anchors. The second bar extends between the second set of seat track anchors and is secured thereto. The second set of adjustable strap anchors is secured to the second bar, and the second set of adjustable strap anchors is configured to be securable to the wheelchair.

20 Claims, 4 Drawing Sheets

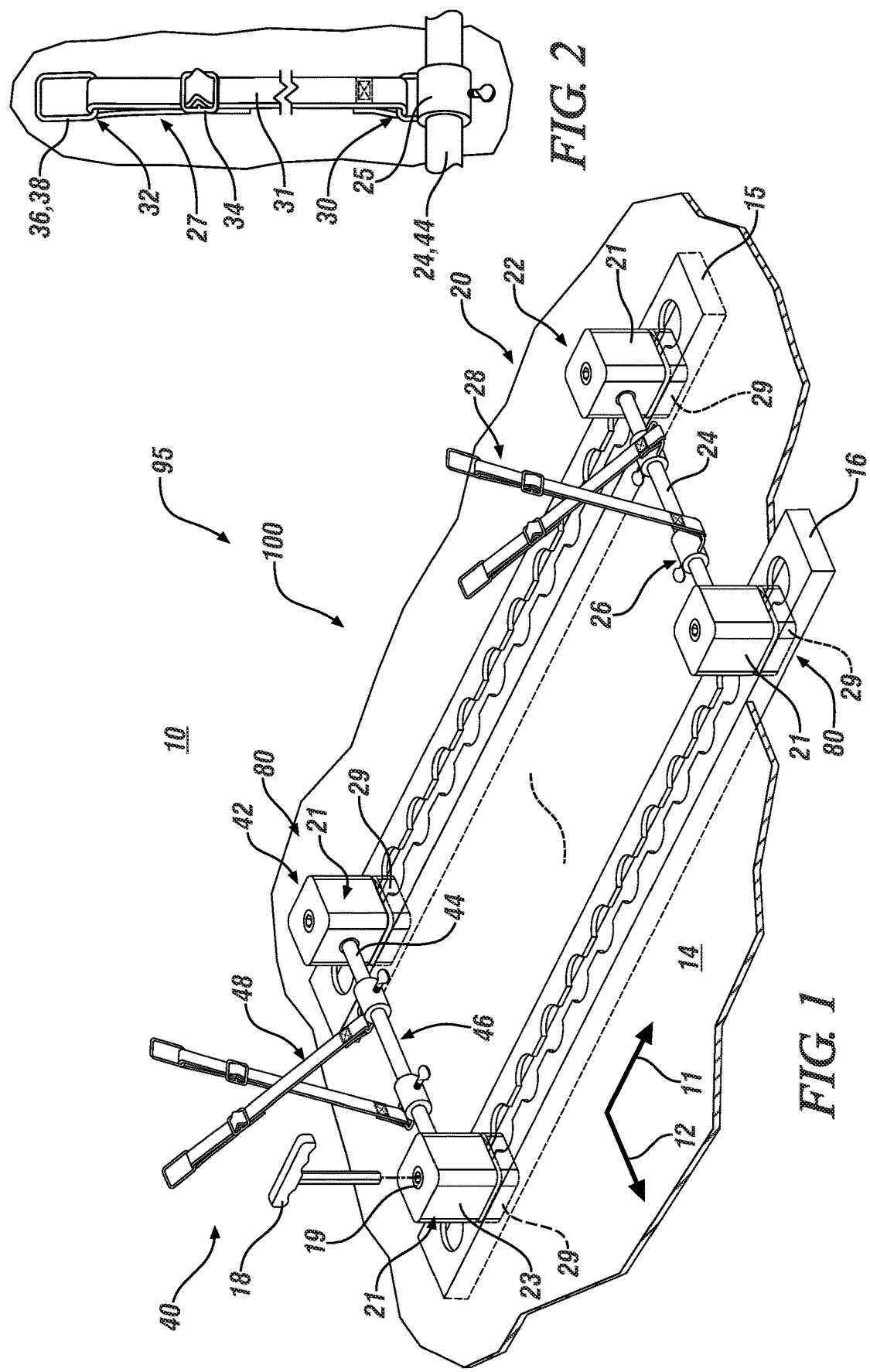

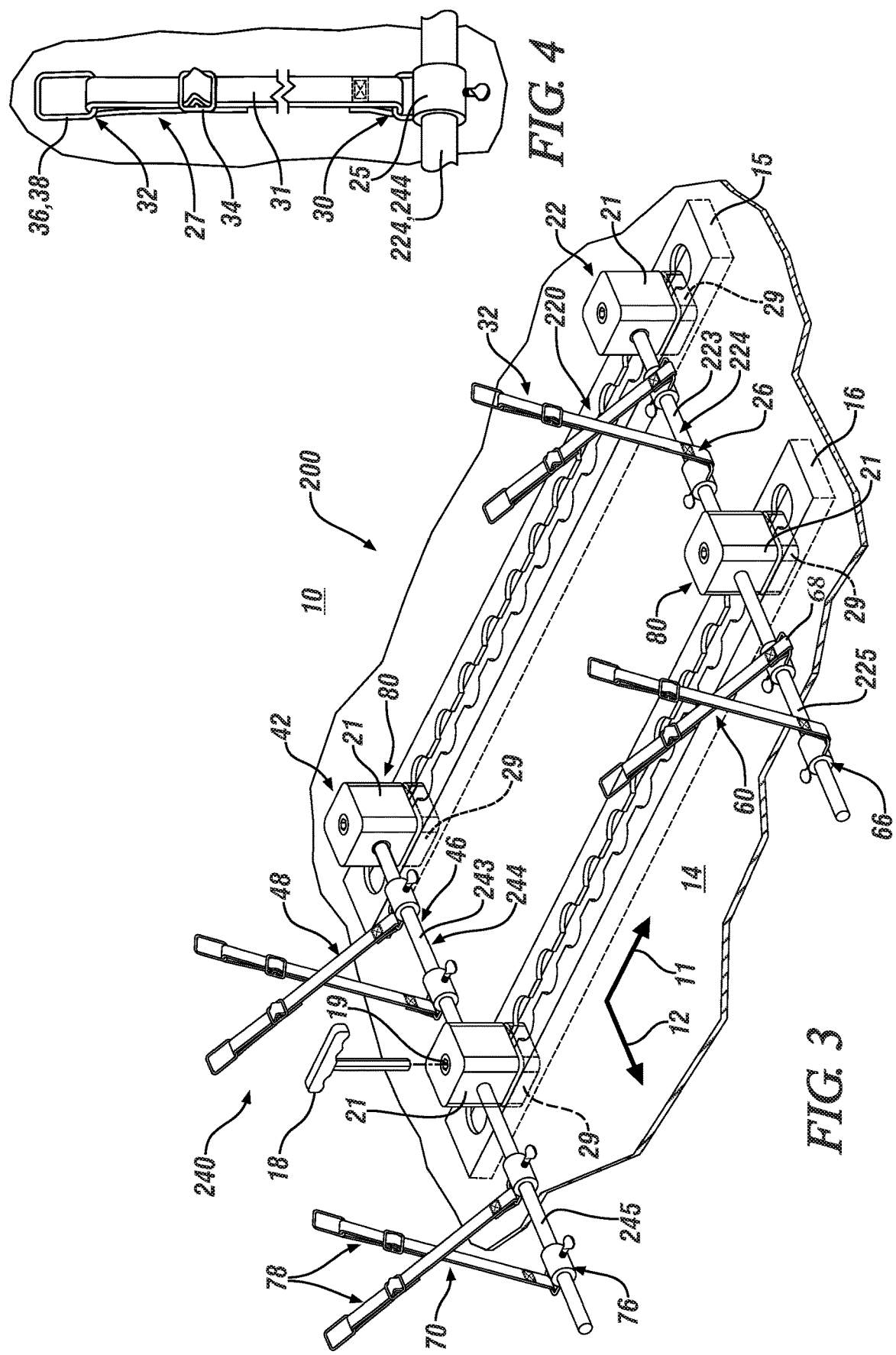

WHEELCHAIR SECUREMENT SYSTEM AND ASSEMBLY

TECHNICAL FIELD

The concepts described herein relate to assemblies and systems for securing wheelchairs in aircrafts.

BACKGROUND

Presently, a wheelchair-bound passenger desiring to travel on an aircraft is transferred out of their own chair prior to entering the aircraft, and is placed into a second wheeled chair that is designed to navigate an aisle. The passenger is transported onto the aircraft to an assigned seat and lifted into the assigned seat by aircraft staff. The wheelchair may be stored in a cargo area during flight, which may cause damage to the wheelchair.

SUMMARY

The concepts disclosed herein include an assembly and a system that provide an anchor for a wheelchair to allow a wheelchair-bound passenger to remain in their own chair during flight, thus facilitating the use of personal wheelchairs on commercial flights.

As described herein, a wheelchair securement system for an aircraft includes a first anchoring mechanism and a second anchoring mechanism. The first anchoring mechanism includes a first bar, a first set of seat track anchors, and a first set of adjustable strap anchors. The first bar extends between the first set of seat track anchors and is secured thereto. The first set of adjustable strap anchors is secured to the first bar, and the first set of adjustable strap anchors is configured to be securable to a wheelchair. The second anchoring mechanism includes a second bar, a second set of seat track anchors, and a second set of adjustable strap anchors. The second bar extends between the second set of seat track anchors and is secured thereto. The second set of adjustable strap anchors is secured to the second bar, and the second set of adjustable strap anchors is configured to be securable to the wheelchair.

An aspect of the disclosure includes the first set of adjustable strap anchors being slidably disposed on and fixedly securable to the first bar, and wherein the second set of adjustable strap anchors being secured to the second bar includes the second set of adjustable strap anchors being slidably disposed on and fixedly securable to the second bar.

Another aspect of the disclosure includes the first set of adjustable strap anchors being coupled to a first set of flexible straps, wherein a first end of each of the first set of flexible straps is secured to one of the first set of adjustable strap anchors, and wherein a second end of each of the first set of flexible straps includes a first load-bearing connector that is securable to the wheelchair Another aspect of the disclosure includes the second set of adjustable strap anchors being coupled to a second set of flexible straps, wherein a first end of each of the second set of flexible straps is secured to one of the second set of adjustable strap anchors, and wherein a second end of each of the second set of flexible straps includes a second load-bearing connector that is securable to the wheelchair.

Another aspect of the disclosure includes each of the first and second load-bearing connectors being a spring-loaded clip.

Another aspect of the disclosure includes each of the first and second load-bearing connectors being coated with one of an epoxy material or a polyurethane material.

Another aspect of the disclosure includes each of the first and second sets of flexible straps being fabricated from a high-tensile strength woven material.

Another aspect of the disclosure includes each of the flexible straps being an adjustable length flexible strap.

Another aspect of the disclosure includes each of the adjustable length flexible straps includes a releasable tensioning device.

Another aspect of the disclosure includes the first set of flexible straps being configured to be securable to the wheelchair in a laterally-crossed arrangement.

Another aspect of the disclosure includes the first and second bars being fabricated from one of aluminum, titanium, composite material, or steel.

Another aspect of the disclosure includes the first anchoring mechanism being configured to be securable to a forward portion of the wheelchair, and wherein the second anchoring mechanism being configured to be securable to a rearward portion of the wheelchair.

Another aspect of the disclosure includes the first set of seat track anchors including a first seat track anchor that is securable onto a first seat track, and a second seat track anchor that is securable onto a second seat track. The second set of seat track anchors includes a third seat track anchor that is securable onto the first seat track, and a fourth seat track anchor that is securable onto the second seat track.

Another aspect of the disclosure includes the first bar being arranged in parallel with the second bar, and wherein the first and second bars are arranged orthogonal to the first and second seat tracks.

Another aspect of the disclosure includes a third set of adjustable strap anchors; and a fourth set of adjustable strap anchors. The first bar includes a first cantilevered portion and the second bar includes a second cantilevered portion. At least one of the third set of adjustable strap anchors is slidably disposed on and fixedly securable to the first cantilevered portion of the first bar, and at least one of the fourth set of adjustable strap anchors is slidably disposed on and fixedly securable to the second cantilevered portion of the second bar.

Another aspect of the disclosure includes a wheelchair securement assembly for an aircraft that includes a first anchoring mechanism including a first bar, a first set of seat track anchors, and a first set of adjustable strap anchors, and a second anchoring mechanism including: a second bar, second set of seat track anchors, and a second set of adjustable strap anchors. One of the first set of seat track anchors is securable to a first seat track, and one of the second set of seat track anchors is securable to the first seat track, and the first bar extends therebetween. One of the first set of seat track anchors is securable to a second seat track, and one of the second set of seat track anchors is securable to the second seat track, and the second bar extends therebetween. The first set of adjustable strap anchors is slidably disposed on and fixedly securable to the first bar, and the second set of adjustable strap anchors are slidably disposed on and fixedly securable to the second bar. The first and second sets of adjustable strap anchors are configured to be securable to a wheelchair.

Another aspect of the disclosure includes the first set of adjustable strap anchors being coupled to a first set of flexible straps, wherein a first end of each of the first set of flexible straps is secured to one of the first set of adjustable strap anchors, and a second end of each of the first set of flexible straps includes a first load-bearing connector that is securable to the wheelchair. The second set of adjustable strap anchors are coupled to a second set of flexible straps, wherein a first end of each of the second set of flexible straps is secured to one of the second set of adjustable strap anchors, and wherein a second end of each of the second set of flexible straps includes a second load-bearing connector that is securable to the wheelchair.

Another aspect of the disclosure includes the first set of adjustable strap anchors being configured to be securable to the wheelchair in a laterally-crossed arrangement.

Another aspect of the disclosure includes a third set of adjustable strap anchors and a fourth set of strap adjustable anchors. The first bar includes a first cantilevered portion and the second bar includes a second cantilevered portion. At least one of the third set of adjustable strap anchors is slidably disposed on and fixedly securable to the first cantilevered portion of the first bar, and at least one of the fourth set of adjustable strap anchors is slidably disposed on and fixedly securable to the second cantilevered portion of the second bar.

Another aspect of the disclosure includes the first set of adjustable strap anchors being configured to be securable to a forward portion of the wheelchair, and the second set of adjustable strap anchors being configured to be securable to a rearward portion of the wheelchair.

Another aspect of the disclosure includes a wheelchair securement assembly for an aircraft that includes a first anchoring mechanism, including a first bar, a first set of seat track anchors, a first set of strap anchors, and a first set of flexible straps including first set of load-bearing connectors. The first set of seat track anchors is securable to a first seat track that is secured in the aircraft, the first bar includes a simply-supported portion between the first set of seat track anchors, the first set of strap anchors is secured to the first bar, and wherein the first set of flexible straps is secured to the first set of strap anchors, and the first set of load-bearing connectors is configured to be securable to a wheelchair. A second anchoring mechanism includes a second bar, a second set of seat track anchors, a second set of strap anchors, and a second set of flexible straps including a second set of load-bearing connectors. The second set of seat track anchors is securable to a second seat track, the second bar includes a simply-supported portion between the first set of seat track anchors, the second set of strap anchors is secured to the second bar, the second set of flexible straps is secured to the second set of strap anchors, and the second set of load-bearing connectors is configured to be securable to the wheelchair.

The above summary is not intended to represent every possible embodiment or every aspect of the present disclosure. Instead, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which:

FIGS. 1 and 2 illustrate pictorial views of an embodiment of a wheelchair securement assembly, in accordance with the disclosure.

FIGS. 3 and 4 illustrate pictorial views of another embodiment of a wheelchair securement assembly, in accordance with the disclosure.

Figure 5:
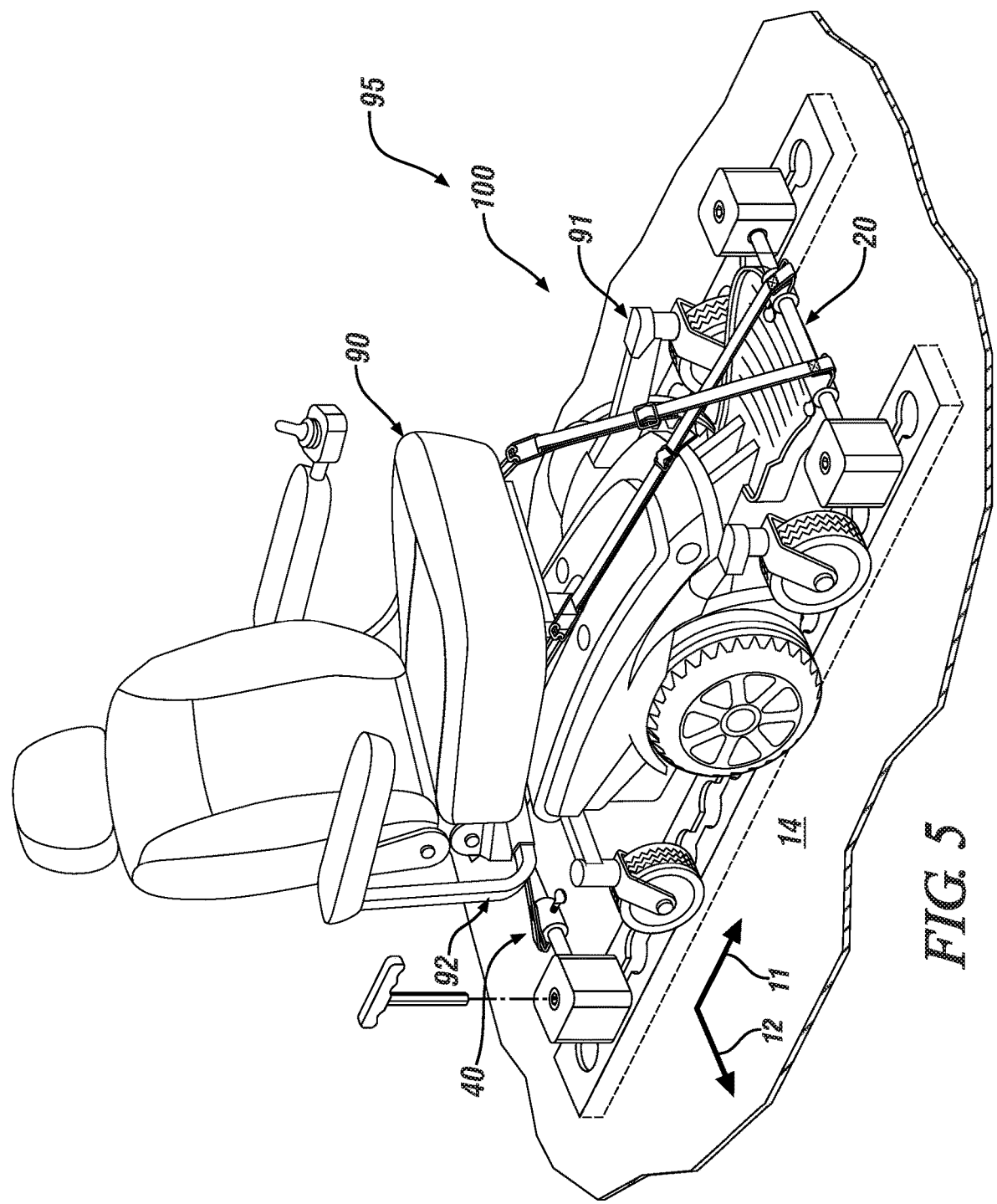
FIG. 5 illustrates a pictorial view of an embodiment of a wheelchair securement assembly and a wheelchair secured thereon in a longitudinal orientation, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. Furthermore, the term "set" as employed herein may refer to one, two, three, four, or another quantity of the referenced elements, and is not limited to the quantity illustrated in the various drawings.

Referring now to the drawings, FIGS. 1 and 2, consistent with embodiments disclosed herein, illustrates an embodiment of a wheelchair securement assembly 100 that may be employed on a vehicle, e.g., an aircraft 10. The aircraft 10 may include any of various fixed-wing crafts, helicopters, etc. The aircraft 10 includes first and second seat tracks 15, 16, respectively, which are secured to and flush with a horizontally-oriented floor 14 that is secured to an airframe of the aircraft 10. In one embodiment, the first and second seat tracks 15, 16 are configured for securing passenger seats and/or other devices to the horizontally-oriented floor 14. In one embodiment, and as shown with reference to the figures, the first and second seat tracks 15, 16 are arranged in parallel with the longitudinal axis 11.

Alternatively, the first and second seat tracks 15, 16 are arranged in parallel with the lateral axis 12.

The wheelchair securement assembly 100 includes anchoring mechanisms 80, such as a first anchoring mechanism 20 and a second anchoring mechanism 40. Each anchoring mechanism 20, 40 includes a bar 24, a set 22, 42 of seat track anchors 21, and a set 26, 46 of adjustable strap anchors 25. A system 95 for securing a wheelchair includes the wheelchair securement assembly 100 and flexible straps 27. The set 22, 42 of seat track anchors 21 are secured to the first and second seat tracks 15, 16. The flexible straps 27 can include a first set 28 of the flexible straps 27 and a second set 48 of flexible straps 27, as described in more detail below.

The anchoring mechanisms 80 each include a plurality of seat tracks 21 that are secured to the first and second seat tracks 15, 16, a plurality of adjustable strap anchors 25, and a plurality of flexible straps 27 that are arranged as described herein. The concepts are described with reference to a longitudinal axis 11 and a lateral axis 12, wherein the longitudinal axis 11 is defined by a longitudinal axis of the aircraft 10, and the lateral axis 12 is orthogonal to the longitudinal axis 11 on a plane defined by the horizontally-oriented floor 14. In one embodiment, the wheelchair securement assembly 100 includes a first anchoring mechanism 20, which includes a first bar 24, a first set 22 of seat track anchors 21, a first set 26 of adjustable strap anchors 25, and a first set 28 of flexible straps 27. The wheelchair securement assembly 100 also includes a second anchoring mechanism 40, which includes a second bar 44, a second set 42 of seat track anchors 21, a second set 46 of adjustable strap anchors 25, and a second set 48 of flexible straps 27.

Each of the seat track anchors 21 includes a body portion 23 and a screw/nut combination including a fastener 29 attached to a threaded screw 19 that is threaded in an orifice in the body portion 23. The fastener 29 can be inserted into one of the first and second seat tracks 15, 16. The threaded screw 19 can be rotated in a first direction, via a tool 18, to tighten and thus secure the body portion 23 of the seat track anchor 21 to the respective first or second seat track 15, 16 via the fastener 29. The threaded screw 19 can be rotated in a second, opposite direction, via tool 18, to loosen and thus release the body portion 23 of the seat track anchor 21 from the respective first or second seat track 15, 16. Each of the seat track anchors 21 may be installed in any desired location of the respective first or second seat track 15, 16, and may be subsequently removed.

Each of the adjustable strap anchors 25 includes a tubular collar that is slidably disposed on and fixedly securable to one of the first bar 24 or the second bar 44 via a fastener, and is mechanically coupled to one of the flexible straps 27.

Each of the flexible straps 27 includes a strap portion 31 that may be fabricated from a high-tensile strength woven material in one embodiment, and having a first end 30 and a second end 32. In one embodiment, and as shown, each of the flexible straps 27 is arranged as an adjustable length flexible strap that includes a releasable tensioning device 34. The releasable tensioning device 34 may be a releasable ratchet device, a buckle strap, an endless loop strap, a cargo strap, etc. The first end 30 of each of the flexible straps 27 is secured to one of the adjustable strap anchors 25. The second end 32 of each of the flexible straps 27 includes a load-bearing connector 36 that is securable to the wheelchair 90.

The load-bearing connectors 36 are removable devices that are arranged to provide load-bearing connections between attachment points on the wheelchair 90 and the respective flexible strap 27. The load-bearing connectors 36 may be spring-loaded clips such as caribiner clips, shackles, spring hooks, snap links, etc.

The load-bearing connectors 36 may be coated with an epoxy material, a polyurethane material, or another material that reduces a likelihood of scratching or marring a surface of the wheelchair 90 proximal to the attachment points.

The first anchoring mechanism 20 of the wheelchair securement assembly 100 includes the first bar 24, the first set 22 of the seat track anchors 21, the first set 26 of the adjustable strap anchors 25, and the first set 28 of the flexible straps 27.

The first bar 24 is arranged as a simply-supported beam that extends between the first set 22 of the seat track anchors 21 and is secured thereto.

Each of the first set 26 of adjustable strap anchors 25 is slidably disposed on and fixedly securable to the first bar 24, and is configured to be securable to a wheelchair. Embodiments of a wheelchair 90 are shown with reference to FIGS. 5 and 6.

In one embodiment and as shown with reference to the wheelchair 90 of FIG. 5, the first set 26 of adjustable strap anchors 25 of the first anchoring mechanism 20 are configured to be securable to a forward portion 91 of the wheelchair 90 via a first set 28 of the flexible straps 27.

Alternatively, the first set 26 of adjustable strap anchors 25 of the first anchoring mechanism 20 is configured to be securable to a rearward portion 92 of the wheelchair 90 via the first set 28 of flexible straps 27. In one embodiment and as shown with reference to the wheelchair 90 of FIG. 4, the first set 26 of adjustable strap anchors 25 of the first anchoring mechanism 20 is configured to be securable to a first side portion 93 of the wheelchair 90 via a first set 28 of the flexible straps 27.

Alternatively, the first set 26 of adjustable strap anchors 25 of the first anchoring mechanism 20 is configured to be securable to a second side portion 94 of the wheelchair 90 via the first set 28 of flexible straps 27.

The second anchoring mechanism 40 of the wheelchair securement assembly 100 also includes the second bar 44, the second set 42 of the seat track anchors 21, the second set 46 of the adjustable strap anchors 25, and the second set 48 of the flexible straps 27. The second bar 44 is arranged as a simply-supported beam that extends between the second set 42 of seat track anchors 21 and is secured thereto. The second set 46 of adjustable strap anchors 25 is slidably disposed on and fixedly securable to the second bar 44, and the second set 46 of adjustable strap anchors 25 is configured to be securable to the wheelchair via a second set 48 of the flexible straps 27. In one embodiment and as shown with reference to the wheelchair 90 of FIG. 3, the second set 46 of adjustable strap anchors 25 of the second anchoring mechanism 40 is configured to be securable to the rearward portion 92 of the wheelchair 90.

Alternatively, the second set 46 of adjustable strap anchors 25 of the second anchoring mechanism 40 is configured to be securable to the forward portion 91 of the wheelchair 90 via the second set 48 of flexible straps 27. In one embodiment and as shown with reference to the wheelchair 90 of FIG. 4, the second set 46 of adjustable strap anchors 25 of the second anchoring mechanism 40 are configured to be securable to a first side portion 93 of the wheelchair 90 via the second set 48 of the flexible straps 27.

Alternatively, the second set 46 of the adjustable strap anchors 25 of the second anchoring mechanism 40 are configured to be securable to the second side portion 94 of the wheelchair 90 via the second set 48 of flexible straps 27.

The second set 48 of the flexible straps 27 may be securable to the wheelchair 90 in a laterally-crossed arrangement, as shown with reference to FIG. 1.

The first and second bars 24, 44 are fabricated from one of aluminum, titanium, steel, composite material, or another high-strength material. The first bar 24 is arranged in parallel with the second bar 44. The first and second bars 24, 44 are arranged to be in parallel with the lateral axis 12 and to be orthogonal to the longitudinal axis 11 in one embodiment. The first and second bars 24, 44 are arranged orthogonal to the first and second seat tracks 15, 16.

FIGS. 3 and 4 schematically illustrate another embodiment of a wheelchair securement assembly 200 that may be employed on a vehicle, e.g., aircraft 10. The wheelchair securement assembly 200 is analogous to the wheelchair securement assembly 100 that is described with reference to FIG. 1 in many aspects. The wheelchair securement assembly 200 includes a first anchoring mechanism 220, which includes a simply-supported portion 223 of a first bar 224, the first set 22 of the seat track anchors 21, the first set 26 of adjustable strap anchors 25, and the first set 28 of flexible straps 27. The wheelchair securement assembly 200 includes a second anchoring mechanism 240, which includes a simply-supported portion 243 of a second bar 244, the second set 42 of seat track anchors 21, the second set 46 of adjustable strap anchors 25, and the second set 48 of flexible straps 27.

The wheelchair securement assembly 200 includes a third anchoring mechanism 60, which includes a first cantilevered portion 225 of the first bar 224, a third set 66 of the adjustable strap anchors 25 and a third set 68 of the flexible straps 27.

The wheelchair securement assembly 200 includes a fourth anchoring mechanism 70, which includes a second cantilevered portion 245 of the second bar 244, a third set 76 of the adjustable strap anchors 25 and a third set 78 of the flexible straps 27.

The simply-supported portion 223 of the first bar 224 extends between the first set 22 of seat track anchors 21 and is secured thereto. The first cantilevered portion 225 of the first bar 224 extends laterally from one (as shown) or both of the first set 22 of seat track anchors 21. The first set 26 of adjustable strap anchors 25 is slidably disposed on and fixedly securable to the simply-supported portion 223 of the first bar 224. The simply-supported portion 243 of the second bar 244 extends between the second set 42 of seat track anchors 21 and is secured thereto, and the second cantilevered portion 245 of the second bar 244 extends laterally from one (as shown) or both of the second set 42 of seat track anchors 21. The second set 46 of adjustable strap anchors 25 is slidably disposed on and fixedly securable to the simply-supported portion 243 of the second bar 244.

The third anchoring mechanism 60 includes a third set 66 of the adjustable strap anchors 25 and a third set 68 of the flexible straps 27. At least one of the third set 66 of adjustable strap anchors 25 is slidably disposed on and fixedly securable to the first cantilevered portion 225 of the first bar 224.

The fourth anchoring mechanism 70 includes a fourth set 76 of the adjustable strap anchors 25 and a fourth set 78 of the flexible straps 27. Each of the fourth set 76 of the adjustable strap anchors 25 is slidably disposed on and fixedly securable to the second cantilevered portion 245 of the second bar 244.

The third and fourth anchoring mechanisms 60, 70 may be deployed in conjunction with the first and second anchoring mechanisms 20, 40 to secure a single wheelchair.

Alternatively, the first and second anchoring mechanisms 20, 40 may be deployed to secure a first wheelchair, and the third and fourth anchoring mechanisms 60, 70 may be deployed to secure a second wheelchair that is disposed beside the first wheelchair.

FIG. 5 illustrates an embodiment of the wheelchair securement assembly 100 that is described with reference to FIGS. 1 and 2, with wheelchair 90 secured thereon in a longitudinal orientation, i.e., wherein a longitudinal axis of the wheelchair 90 is parallel with the longitudinal axis 11. An embodiment of the first anchoring mechanism 20 is secured to a forward portion 91 of the wheelchair 90, and an embodiment of the second anchoring mechanism 40 is secured to a rearward portion 92 of the wheelchair 90.

Figure 6:
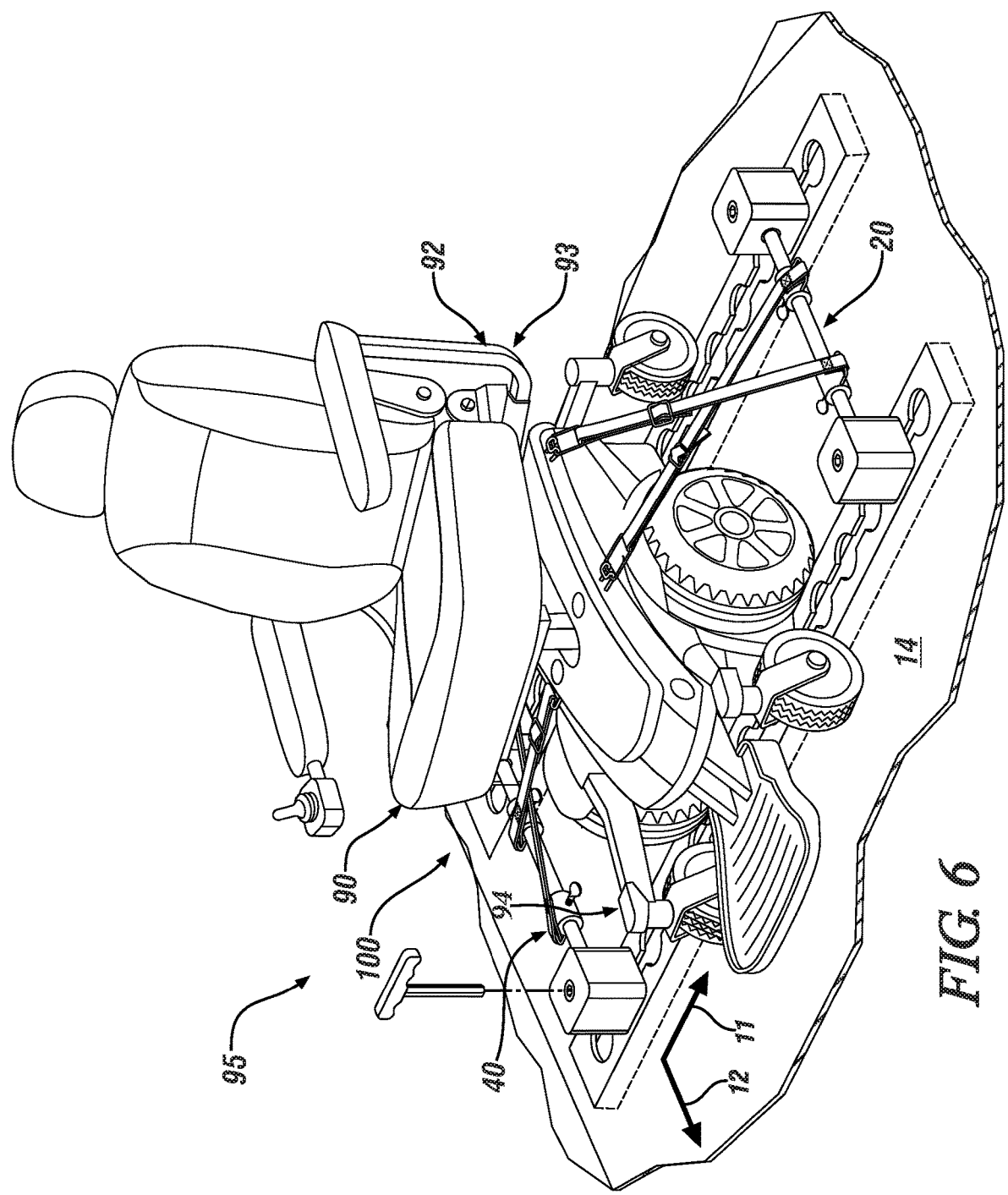
FIG. 6 illustrates a pictorial view of an embodiment of a wheelchair securement assembly and a wheelchair secured thereon in a lateral orientation, in accordance with the disclosure.

FIG. 6 illustrates an embodiment of the wheelchair securement assembly 100 that is described with reference to FIGS. 3 and 4, with wheelchair 90 secured thereon in a lateral orientation, i.e., wherein a longitudinal axis of the wheelchair 90 is parallel with the lateral axis 12. An embodiment of the first anchoring mechanism 20 is secured to a first side portion 93 of the wheelchair 90, and an embodiment of the second anchoring mechanism 40 is secured to the second side portion 94 of the wheelchair 90.

The concepts described herein also include a method for securing a wheelchair into a vehicle such as an aircraft. The method includes securing a first anchoring mechanism into first and second seat tracks of the vehicle, and securing a second anchoring mechanism into the first and second seat tracks of the vehicle. Securing the first anchoring mechanism into the first and second seat tracks includes extending and securing a first bar between a first set of seat track anchors, and extending and securing a second bar between a second set of seat track anchors. The method further includes securing a first set of adjustable strap anchors to the first bar, and securing a second set of adjustable strap anchors to the second bar. The method further includes securing a first set of flexible straps to the first set of adjustable strap anchors, and securing a second set of flexible straps to the second set of adjustable strap anchors. The method further includes securing the first set of flexible straps to a forward portion of a wheelchair, and securing the second set of flexible straps to a forward portion of the wheelchair.

In summary, a wheelchair securement assembly 100, such as may be employed on an aircraft 10, is disclosed herein, and includes a first anchoring mechanism 20 that includes a first bar 24, a first set 22 of seat track anchors 21, and a first set 26 of adjustable strap anchors 25. The first bar 24 extends between the first set 22 of seat track anchors 21 and is secured thereto, and the first set 26 of adjustable strap anchors 25 is secured to the first bar 24. The first set 26 of adjustable strap anchors 25 is configured to be securable to a wheelchair 90. The wheelchair securement assembly 100 also includes a second anchoring mechanism 40 including a second bar 44, a second set 42 of seat track anchors 21, and a second set 46 of adjustable strap anchors 25. The second bar 44 extends between the second set 44 of seat track anchors 21 and is secured thereto, and the second set 46 of adjustable strap anchors 25 is secured to the second bar 44. The second set 46 of adjustable strap anchors 25 is configured to be securable to the wheelchair 90.

The first set 26 of adjustable strap anchors 21 may be slidably disposed on and fixedly securable to the first bar 24, and the second set 46 of adjustable strap anchors 21 may be slidably disposed on and fixedly securable to the second bar 44.

The first set 26 of adjustable strap anchors 21 may be coupled to a first set 28 of flexible straps 27, wherein a first end 30 of each of the first set 28 of flexible straps 27 is secured to one of the first set 26 of adjustable strap anchors 21, and wherein a second end 32 of each of the first set 28 of flexible straps 27 includes a load-bearing connector 36 that is securable to the wheelchair 90.

The second set 46 of adjustable strap anchors 25 may be coupled to a second set 48 of flexible straps 27, wherein a first end 30 of each of the second set 48 of flexible straps 27 is secured to one of the second set 46 of adjustable strap anchors 25, and wherein a second end 32 of each of the second set 48 of flexible straps 27 includes a load-bearing connector 36 that is securable to the wheelchair 90.

Each of the load-bearing connectors 36 comprises a spring-loaded clip, and each may be coated with one of an epoxy material 38 or a polyurethane material.

Each of the first and second sets 28, 48 of flexible straps 27 is fabricated from a high-tensile strength woven material.

Each of the first and second sets 28, 48 of flexible straps 27 is an adjustable length flexible strap.

Each of the adjustable length flexible straps of the first and second sets 28, 48 of flexible straps 27 includes a releasable tensioning device 34.

The first set 28 of flexible straps 27 is configured to be securable to the wheelchair 90 in a laterally-crossed arrangement.

The first and second bars 24, 44 are fabricated from one of aluminum, titanium, composite material, or steel.

The first anchoring mechanism 20 is configured to be securable to a forward portion 91 of the wheelchair 90, and the second anchoring mechanism 40 is configured to be securable to a rearward portion 92 of the wheelchair 90.

The first set 22 of seat track anchors includes a first seat track anchor 21 that is securable onto a first seat track 15, and a second seat track anchor 21 that is securable onto a second seat track 16. The second set 42 of seat track anchors includes a third seat track anchor 21 that is securable onto the first seat track 15, and a fourth seat track anchor 21 that is securable onto the second seat track 16.

The first bar 24 is arranged in parallel with the second bar 44, and the first and second bars 24, 44 are arranged orthogonal to the first and second seat tracks 15, 16.

The wheelchair securement assembly 200 may include a third set 60 of adjustable strap anchors 25 and a fourth set 70 of adjustable strap anchors 25. The first bar 224 includes a first cantilevered portion 225 and the second bar 244 includes a second cantilevered portion 245. At least one of the third set 60 of adjustable strap anchors 25 is slidably disposed on and fixedly securable to the first cantilevered portion 225 of the first bar 224, and at least one of the fourth set 70 of adjustable strap anchors 25 is slidably disposed on and fixedly securable to the second cantilevered portion 245 of the second bar 244.

The components of the disclosed embodiments, as described and illustrated herein, may be arranged and designed in a variety of different configurations. Thus, the detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Furthermore, the detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A wheelchair securement assembly for an aircraft, comprising:
    a first anchoring mechanism, including: a first bar, a first set of seat track anchors, and a first set of adjustable strap anchors,
        wherein the first bar extends between the first set of seat track anchors and is secured thereto,
        wherein the first set of adjustable strap anchors is secured to the first bar, and
        wherein the first set of adjustable strap anchors is configured to be securable to a wheelchair; and
    a second anchoring mechanism including: a second bar, a second set of seat track anchors, and a second set of adjustable strap anchors,
        wherein the second bar extends between the second set of seat track anchors and is secured thereto,
        wherein the second set of adjustable strap anchors is secured to the second bar, and
        wherein the second set of adjustable strap anchors is configured to be securable to the wheelchair.

2. The wheelchair securement assembly of claim 1, wherein the first set of adjustable strap anchors being secured to the first bar comprises the first set of adjustable strap anchors being slidably disposed on and fixedly securable to the first bar, and wherein the second set of adjustable strap anchors being secured to the second bar comprises the second set of adjustable strap anchors being slidably disposed on and fixedly securable to the second bar.

3. The wheelchair securement assembly of claim 1, wherein the first set of adjustable strap anchors being configured to be securable to the wheelchair comprises the first set of adjustable strap anchors being coupled to a first set of flexible straps, wherein a first end of each of the first set of flexible straps is secured to one of the first set of adjustable strap anchors, and wherein a second end of each of the first set of flexible straps includes a first load-bearing connector that is securable to the wheelchair; and
    wherein the second set of adjustable strap anchors being configured to be securable to the wheelchair comprises the second set of adjustable strap anchors being coupled to a second set of flexible straps, wherein a first end of each of the second set of flexible straps is secured to one of the second set of adjustable strap anchors, and wherein a second end of each of the second set of flexible straps includes a second load-bearing connector that is securable to the wheelchair.

4. The wheelchair securement assembly of claim 3, wherein each of the first and second load-bearing connectors comprises a spring-loaded clip.

5. The wheelchair securement assembly of claim 3, further comprising each of the first and second load-bearing connectors being coated with one of an epoxy material or a polyurethane material.

6. The wheelchair securement assembly of claim 3, wherein each of the flexible straps is fabricated from a high-tensile strength woven material.

7. The wheelchair securement assembly of claim 3, wherein each of the flexible straps comprises an adjustable length flexible strap.

8. The wheelchair securement assembly of claim 7, wherein each of the adjustable length flexible straps includes a releasable tensioning device.

9. The wheelchair securement assembly of claim 3, wherein the first set of flexible straps is configured to be securable to the wheelchair in a laterally-crossed arrangement.

10. The wheelchair securement assembly of claim 1, wherein the first and second bars are fabricated from one of aluminum, titanium, composite material, or steel.

11. The wheelchair securement assembly of claim 1, wherein the first anchoring mechanism is configured to be securable to a forward portion of the wheelchair, and wherein the second anchoring mechanism is configured to be securable to a rearward portion of the wheelchair.

12. The wheelchair securement assembly of claim 1,
wherein the first set of seat track anchors includes a first seat track anchor that is securable onto a first seat track, and a second seat track anchor that is securable onto a second seat track;
wherein the second set of seat track anchors includes a third seat track anchor that is securable onto the first seat track, and a fourth seat track anchor that is securable onto the second seat track.

13. The wheelchair securement assembly of claim 12, wherein the first bar is arranged in parallel with the second bar, and wherein the first and second bars are arranged orthogonal to the first and second seat tracks.

14. The wheelchair securement assembly of claim 1, further comprising:
a third set of adjustable strap anchors; and
a fourth set of adjustable strap anchors;
wherein the first bar includes a first cantilevered portion and the second bar includes a second cantilevered portion;
wherein at least one of the third set of adjustable strap anchors is slidably disposed on and fixedly securable to the first cantilevered portion of the first bar; and
wherein at least one of the fourth set of adjustable strap anchors is slidably disposed on and fixedly securable to the second cantilevered portion of the second bar.

15. A wheelchair securement assembly for an aircraft, comprising:
a first anchoring mechanism, including: a first bar, a first set of seat track anchors, and a first set of adjustable strap anchors; and
a second anchoring mechanism including: a second bar, second set of seat track anchors, and a second set of adjustable strap anchors;
wherein one of the first set of seat track anchors is securable to a first seat track, and one of the second set of seat track anchors is securable to the first seat track, and wherein the first bar extends therebetween;
wherein one of the first set of seat track anchors is securable to a second seat track, and one of the second set of seat track anchors is securable to the second seat track, and wherein the second bar extends therebetween;
wherein the first set of adjustable strap anchors are slidably disposed on and fixedly securable to the first bar;
wherein the second set of adjustable strap anchors are slidably disposed on and fixedly securable to the second bar; and
wherein the first and second sets of adjustable strap anchors are configured to be securable to a wheelchair.

16. The wheelchair securement assembly of claim 15, wherein the first and second sets of adjustable strap anchors being configured to be securable to the wheelchair comprises the first set of adjustable strap anchors being coupled to a first set of flexible straps, wherein a first end of each of the first set of flexible straps is secured to one of the first set of adjustable strap anchors, and wherein a second end of each of the first set of flexible straps includes a first load-bearing connector that is securable to the wheelchair; and the second set of adjustable strap anchors being coupled to a second set of flexible straps, wherein a first end of each of the second set of flexible straps is secured to one of the second set of adjustable strap anchors, and wherein a second end of each of the second set of flexible straps includes a second load-bearing connector that is securable to the wheelchair.

17. The wheelchair securement assembly of claim 15, wherein the first set of adjustable strap anchors are configured to be securable to the wheelchair in a laterally-crossed arrangement.

18. The wheelchair securement assembly of claim 15, further comprising:
a third set of adjustable strap anchors; and
a fourth set of strap adjustable anchors;
wherein the first bar includes a first cantilevered portion and the second bar includes a second cantilevered portion;
wherein at least one of the third set of adjustable strap anchors is slidably disposed on and fixedly securable to the first cantilevered portion of the first bar; and
wherein at least one of the fourth set of adjustable strap anchors is slidably disposed on and fixedly securable to the second cantilevered portion of the second bar.

19. The wheelchair securement assembly of claim 15, wherein the first set of adjustable strap anchors is configured to be securable to a forward portion of the wheelchair, and wherein the second set of adjustable strap anchors is configured to be securable to a rearward portion of the wheelchair.

20. A system for securing a wheelchair in an aircraft, comprising:
a first anchoring mechanism including a first bar, first set of seat track anchors, and a first set of strap anchors;
a first set of flexible straps including a first set of second load-bearing connectors;
a second anchoring mechanism including a second bar, a second set of seat track anchors, a second set of strap anchors; and
a second set of flexible straps including a second set of load-bearing connectors;
wherein the first set of seat track anchors is securable to a first seat track that is secured in the aircraft,
wherein the first bar includes a simply-supported portion between the first set of seat track anchors,
wherein the first set of strap anchors is secured to the first bar, and wherein the first set of flexible straps is secured to the first set of strap anchors,
wherein the second set of seat track anchors is securable to a second seat track,
wherein the second bar includes a simply-supported portion between the second set of seat track anchors,
wherein the second set of strap anchors is secured to the second bar,
wherein the second set of flexible straps is secured to the second set of strap anchors, and
wherein the first and second set of load-bearing connectors are configured to be securable to the wheelchair.

* * * * *